S. Lagowitz,
Traveling Bag.

Nº 84,364. Patented Nov. 24, 1868.

Witnesses:
E. F. Kostenhuber
C. Wahlers

Inventor:
Saml Lagowitz
Van Santvoord & Hauff
attys

SAMUEL LAGOWITZ, OF NEWARK, NEW JERSEY.

*Letters Patent No. 84,364, dated November 24, 1868.*

IMPROVEMENT IN FRAMES FOR TRAVELLING-BAGS.

The Schedule referred to in these Letters Patent and making part of the same.

*To all whom it may concern:*

Be it known that I, SAMUEL LAGOWITZ, of Newark, in the county of Essex, and State of New Jersey, have invented a new and useful Improvement in Frames for Travelling-Bags; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
Figure 1 is a transverse section of this invention.
Figure 2:
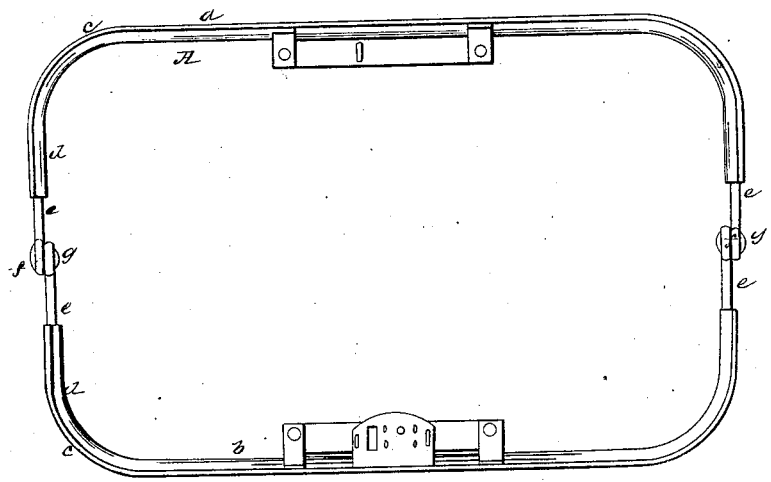
Figure 2 is a plan thereof, when the frame is open.

This invention relates to a travelling-bag frame, which is made of sheet-iron, one edge of each jaw being doubled up, so that the sheet-metal will not injure the covering, and the other edge of each jaw being made to receive a wire, which serves to strengthen the frame, and the ends of which form the joints on which the jaws open and close.

A represents a frame for travelling-bags, composed of two jaws, $a\ b$, in the usual form or shape. Each of these jaws is made of sheet-metal, (sheet-iron being used by preference,) and the edges, $c$, of said jaws are doubled up, so that they will not injure or cut the covering of the frame. The edges $d$ of said jaws are strengthened by wires, $e$, which are provided at their ends with loops, $f$, to receive pivots $g$, as shown. By these means a strong and durable frame is obtained, and by the loops $f$ and pivots $g$ a cheap and reliable joint is formed.

Having thus described my invention,

What I claim as new, and desire to secure by Letters Patent, is—

A travelling-bag frame, made of sheet-metal, each jaw having one edge doubled up, and the other provided with a wire, the ends of which form the joints on which the jaws open and close, substantially as shown and described.

SAMUEL LAGOWITZ.

Witnesses:
SAMUEL MORROW, Jr.,
JAMES M. C. MORROW,
LOUIS GREINER.